United States Patent [19]
Burns et al.

[11] Patent Number: 6,088,665
[45] Date of Patent: Jul. 11, 2000

[54] SCHEMATIC GENERATOR FOR USE IN A PROCESS CONTROL NETWORK HAVING DISTRIBUTED CONTROL FUNCTIONS

[75] Inventors: Harry A. Burns; Brent H. Larson; Larry K. Brown, all of Marshalltown, Iowa

[73] Assignee: Fisher Controls International, Inc., Clayton, Mo.

[21] Appl. No.: 08/962,630

[22] Filed: Nov. 3, 1997

[51] Int. Cl.[7] .................................................. G06F 15/173
[52] U.S. Cl. ............................................ 702/188; 702/91
[58] Field of Search ................................ 702/90, 91, 194, 702/116, 127, 188; 364/138, 139, 188; 395/200.47, 200.48, 200.53, 200.83

[56] References Cited

U.S. PATENT DOCUMENTS

| | | | |
|---|---|---|---|
| 4,271,505 | 6/1981 | Menot et al. | 370/85 |
| 4,627,045 | 12/1986 | Olson et al. | 370/16 |
| 4,644,532 | 2/1987 | George et al. | 340/825.52 |

FOREIGN PATENT DOCUMENTS

| | | |
|---|---|---|
| 0 450 116 A1 | 4/1990 | European Pat. Off. . |
| 0 449 458 A1 | 10/1991 | European Pat. Off. . |
| 0 562 333 A2 | 9/1993 | European Pat. Off. . |
| 0 575 150 A2 | 12/1993 | European Pat. Off. . |
| 0 604 091 A2 | 6/1994 | European Pat. Off. . |
| 0 718 727 | 6/1996 | European Pat. Off. . |
| 2 713 360 | 6/1995 | France . |
| 42 10 376 | 10/1992 | Germany . |
| 195 10 466 A1 | 10/1996 | Germany . |
| 196 15 389 | 10/1997 | Germany . |
| WO 92/04676 | 3/1992 | WIPO . |
| WO 94/22776 | 10/1994 | WIPO . |
| WO 96 07957 | 3/1996 | WIPO . |
| WO 96/12993 | 5/1996 | WIPO . |

OTHER PUBLICATIONS

PCT/US98/22311 International Search Report dated Feb. 10, 1999.
Fieldbus Foundation™, "Technical Overview," FD–043 Revision 1.0, 29 pages, 1996.
Fromberger, "Feldbusfähige, intelligente Sensoren," Messen und Prüfen, vol. 27, No. 7, pp. 332, 334–340, 1991.
Watt, "The Double–Distributed Control Network," Thesis submitted to Thayer School of Engineering, Dartmouth College, Hanover, N.H. (Jan. 1984).

(List continued on next page.)

Primary Examiner—Marc S. Hoff
Assistant Examiner—Craig Steven Miller
Attorney, Agent, or Firm—Marshall, O'Toole, Gerstein, Murray & Borun

[57] ABSTRACT

A schematic generator for use in a process control network, in which control functions are implemented by field devices interconnected at various and distributed locations on a bus, polls each of the field devices to retrieve information pertaining to the identity of the device, the identity of the control functions associated with the device, the manner in which the device communicates with other devices with respect to each of the control functions associated with that device, the timing associated with the execution of each of the control functions of that device and the timing of the communication activities associated with each of the control functions of that device. The schematic generator then analyses the retrieved data to identify the manner in which the devices are physically connected on the bus and the manner in which the different control functions are interconnected over the bus to perform process control loops within the process control network. Thereafter, the schematic generator creates one or more schematics, such a maintenance schematic illustrating the physical layout of the field devices in the process control network, a control loop schematic illustrating the interconnections between functions within one or more of the deceives that form a control loop, and a timing schematic illustrating the timing of or the amount of communications occurring on the bus.

30 Claims, 9 Drawing Sheets

U.S. PATENT DOCUMENTS

| | | | |
|---|---|---|---|
| 4,691,328 | 9/1987 | Sterling, Jr. et al. | 375/36 |
| 4,831,558 | 5/1989 | Shoup et al. | 364/550 |
| 4,918,690 | 4/1990 | Markkula, Jr. et al. | 370/94 |
| 4,955,305 | 9/1990 | Garnier et al. | 112/121.11 |
| 4,974,625 | 12/1990 | Paullus et al. | 137/85 |
| 4,976,144 | 12/1990 | Fitzgerald | 73/168 |
| 5,014,185 | 5/1991 | Saito et al. | 364/188 |
| 5,023,869 | 6/1991 | Grover et al. | 370/84 |
| 5,109,692 | 5/1992 | Fitzgerald | 73/168 |
| 5,148,433 | 9/1992 | Johnson et al. | 371/11.3 |
| 5,193,189 | 3/1993 | Flood et al. | 395/650 |
| 5,197,328 | 3/1993 | Fitzgerald | 73/168 |
| 5,216,619 | 6/1993 | Dunbar, Jr. et al. | 364/478 |
| 5,293,635 | 3/1994 | Faulk, Jr. et al. | 364/232.3 |
| 5,404,524 | 4/1995 | Celi, Jr. | 395/700 |
| 5,434,774 | 7/1995 | Seberger et al. | 364/172 |
| 5,439,021 | 8/1995 | Burlage et al. | 137/84 |
| 5,451,923 | 9/1995 | Seberger et al. | 340/310.06 |
| 5,469,150 | 11/1995 | Sitte | 340/825.07 |
| 5,469,548 | 11/1995 | Callison et al. | 395/441 |
| 5,485,455 | 1/1996 | Dobbins et al. | 370/60 |
| 5,530,643 | 6/1996 | Hodorowski | 364/191 |
| 5,558,115 | 9/1996 | Lenz et al. | 137/86 |
| 5,573,032 | 11/1996 | Lenz et al. | 137/486 |
| 5,592,622 | 1/1997 | Isfeld et al. | 395/200.02 |
| 5,606,664 | 2/1997 | Brown et al. | 340/825.06 |
| 5,631,825 | 5/1997 | van Weele et al. | 364/188 |
| 5,650,777 | 7/1997 | Westfield et al. | 340/870.11 |
| 5,684,451 | 11/1997 | Seberger et al. | 340/310.06 |
| 5,684,796 | 11/1997 | Abidi et al. | 370/254 |
| 5,793,975 | 8/1998 | Zeldin | 709/242 |
| 5,850,397 | 12/1998 | Raab et al. | 370/254 |

OTHER PUBLICATIONS

Zielinski et al., "Asset Management Using Fieldbus," Fisher–Rosemont Systems, Inc, pp. 1–14 (1997).

"Advanced Systems Simplify Control," Machine Design, vol. 68, No. 12, pp. 118, 120 (Jul. 11, 1996).

Black, "Combining Lan Technology with Smart Sensors to Provide Predictive Maintenance, Diagnostics and Alarm Systems," Proceedings of the Industrial Computing Conference, Chicago, vol. 3, Sep. 19, 1993, Industrial Computing Society/Instrument Society of America, pp. 345–354 (1993).

Zielinski, "Issues for Digital Field Instrument Networks," INTECH, pp. 92–94 (1989).

Fieldbus Foundation Manual, Communications Technical Specification and User Layer Technical Specification, 1994–1997, including Fieldbus Message Specification FF–870–1.1; Physical Layer Conformance Testing FF–830 FS 1.0: Device Description Language FF–900–1.0; Function Blocks (Part 1) FF–890–1.2; Fieldbus Access Sublayer FF–875–1.1; Function Blocks (Part 2) FF–891–1.2; Data Link Protocol FF–822–1.1; System Management FF–880–1.1; Communication Profile FF–940–1.0; Transducer Blocks (Part 1) FF–902 Rev PS 2.0; Transducer Blocks (Part 2) FF–903–Rev PS 2.0; Data Link Services FF–821–1.0;31.25 kbit/s Physical Layer Profile FF–816–1.0; Network Management FF–801–1.1;and System Architecture FF–800–1.0.

"Fieldvue® ValveLink™ Series VL2000 Software," Fisher–Rosemount Bulletin 62.1: VL2000, pp. 1–6 (Nov. 1995).

"Fieldvue® VL2000 Series Software User Guide," Fisher Controls, Version 2.0 (Jun. 1996).

"Fieldvue® Digital Valve Controller Type DVC5000 Series," Fisher–Rosemount Bulletin 62.1:DVC5000, pp. 1–12 (Jun. 1994).

"Fieldvue™, Digital Valve Controller DVC5000 Series Remotely Accessible Information," Fisher Controls Bulletin 62.1:DVC5000(S1), pp. 1–2 (Jun. 1994).

"Fieldvue™ Digital Valve Controller Type DVC5000 Series," Fisher Controls Form 5335, pp. 1–35 and Errata Sheet (Jun. 1994).

Fisher–Rosemount Systems, "Fieldbus Technical Overview Understanding Foundation™ Fieldbus Technology," 27 pages, 1997.

"Foundation™ Specification, Function Block Application Process," Part 3, 155 pages, 1995–1996.

LOOP1

LOOP1

SCHEMATIC GENERATOR FOR USE IN A PROCESS CONTROL NETWORK HAVING DISTRIBUTED CONTROL FUNCTIONS

FIELD OF THE INVENTION

The present invention relates generally to process control networks and, more specifically, to a schematic generator that automatically generates a field device layout schematic, a process function control loop schematic, and/or one or more communication or timing schematics for a process control network having distributed control functions.

DESCRIPTION OF THE RELATED ART

Large processes such as chemical, petroleum and other manufacturing and refining processes include numerous field devices disposed at various locations to measure and control process parameters to thereby effect control of the process. These field devices may be, for example, sensors such as temperature, pressure, and flow rate sensors as well as control elements such as valves and switches. Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of process parameters according to some overall control scheme. Usually, however, the control scheme implemented by a DCS is proprietary to the DCS manufacturer which, in turn, makes the DCS difficult and expensive to expand, upgrade, reprogram, and service because the DCS provider must become involved in an integral way to perform any of these activities. Furthermore, the equipment that can be used by or connected to any particular DCS may be limited due to the proprietary nature of DCS and the fact that a DCS provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, LONWORKS®, Device-Net®, and CAN protocols, which enable field devices made by different manufacturers to be used together within the same process control loop. In fact, any field device that conforms to one of these protocols can be used within a process to communicate with and to be controlled by a DCS or other controller that supports the protocol, even if that field device is made by a different manufacturer than the DCS manufacturer.

Moreover, there is now a move within the process control industry to decentralize process control and, thereby, simplify DCS controllers or eliminate the need for DCS controllers to a large extent. Decentralized control is obtained by having process control devices, such as valve positioners, transmitters, etc. perform one or more process control functions and by then communicating data across a bus structure for use by other process control devices. To implement control functions, each process control device includes a microprocessor having the capability to perform one or more basic control functions as well as the ability to communicate with other process control devices using a standard and open communication protocol. In this manner, field devices made by different manufacturers can be interconnected within a process control loop to communicate with one another and to perform one or more process control functions or control loops without the intervention of a DCS. The all digital, two-wire loop protocol now being promulgated by the Fieldbus Foundation, known as the FOUNDATION™ Fieldbus protocol (hereinafter the "Fieldbus protocol") is one open communication protocol that allows devices made by different manufacturers to interoperate and communicate with one another via a standard bus to effect decentralized control within a process.

As noted above, the decentralization of process control functions simplifies and, in some cases, eliminates the necessity of a proprietary DCS which, in turn, reduces the need of a process operator or process engineer to rely on the DCS manufacturer to change or upgrade a control scheme implemented by the DCS. In fact, locating basic process control functions within field devices interconnected by a standard communication bus allows a process to be reconfigured, upgraded, enlarged or otherwise changed by reconfiguring the manner in which the field devices communicate with one another. Such communication reconfiguration is relatively simple, however, because all of the devices performing control functions conform to an open communication standard. As a result, reconfiguration of such a control scheme does not involve or use proprietary information of any particular manufacturer or require the reprogramming of any device in a proprietary manner. Furthermore, decentralized control reduces the number of or the length of the wires needed within a process environment because each of the process control devices does not need to be connected directly to a DCS or other controller but, instead, all of the devices can be connected together using a bus-type architecture. Also, decentralized control results in an increase in the overall control speed of a process because of the shorter distances that each communication signal must travel and because data flow bottlenecks which typically occur at a DCS controller are reduced.

While decentralized control makes a process control network easier to reconfigure, it also makes the procedure of accurately documenting changes made to the process control network more critical, precisely because changes in the configuration of the process control network are more likely to occur at various times during the operation of a process. Unfortunately, and contrary to DCS control schemes (which are usually well documented because these schemes are made by or changed in conjunction with input from a DCS provider), the current control scheme being implemented by a process control network using a decentralized control scheme based on, for example, the Fieldbus protocol, may not be very well documented because this control scheme can be changed by any number of process engineers at any time during operation of the process with little or no involvement of a control expert. Thus if, for example, a process operator or engineer does not keep detailed and accurate documentation on the initial set-up and each change, upgrade, or other reconfiguration made to a decentralized process control network, information pertaining to the actual operating configuration of the process control network may be lost, with no simple way of recovering this information. The risk of inaccurate or lost documentation increases when more than one person makes changes to a process or when a process control engineer responsible for a process (and knowledgeable about the current state of the process configuration) retires or otherwise leaves employment. Also, in some cases, incomplete or inaccurate process control configuration documentation may be prepared in the first place due to haste in getting the process control network on line or due to the inexperience of the person responsible for process configuration documentation.

SUMMARY OF THE INVENTION

The present invention is directed to a schematic generator that automatically generates one or more schematic diagrams illustrating the current configuration of a process control network having distributed or decentralized process control functions. The schematic generator of the present invention generates a schematic diagram illustrating, for example, the physical layout of the field devices and other devices within a process control network, the timing and volume of communication flow at any place within a process control network and/or the logical or functional groupings of process control devices forming one or more control loops within the process control network. Using the schematic generator of the present invention, a process engineer can automatically and relatively instantaneously recover all of the information necessary to determine the current operational configuration of a process control network, no matter how complex the process is and no matter how poor the documentation of the process configuration currently may be. In fact, a process engineer may make changes to a process configuration without documenting such changes because the actual or current configuration of the process can be recovered automatically using the schematic generator of the present invention. Likewise, a process engineer may use the schematic generator of the present invention to obtain process control network configuration documentation in a standardized graphical format to enable the process engineer to make further changes to the process control configuration or to diagnose problems within the process control configuration.

According to one aspect of the present invention a schematic generator includes hardware, software or firmware which operates to interrogate each of a number of interconnected devices within a process control network to retrieve linkage data stored in each of the devices. The retrieved linkage data may be any data pertaining to the manner in which each of the devices is connected to the bus and configured to operate within the process control network and may include, for example, physical device connection data, device identity data, process control function data indicating one or more function blocks capable of being performed by each of the devices, function block communication data pertaining to the manner in which the function blocks of the devices are communicatively linked, function block execution timing data and function block bus communication scheduling data. The schematic generator also includes a data analyzer that analyses the retrieved linkage data to determine current process control configuration information such as the physical connections between the devices on the bus, the function blocks that are associated with one or more of the devices, one or more process control loops formed by the function blocks in the process control network, the periods of time during which the function blocks are scheduled to execute and to communicate on the bus and communication bandwidth calculations associated with one or more segments of the bus. Still further, the schematic generator includes a generator that creates a graphical schematic illustrating the process control configuration of the process control network. The generated schematic may be, for example, a maintenance schematic illustrating the physical layout and identity of the field devices in the process control network and the function blocks associated with one or more of the devices in the process control network, a control loop schematic illustrating the interconnections between function blocks within one or more of the deceives that form a control loop, a timing schematic illustrating the time periods associated with scheduled function block executions and function block communications on the bus and/or a communication schematic illustrating a bandwidth calculation associated with one or more segments of the bus.

DESCRIPTION OF THE PREFERRED EMBODIMENTS

Figure 1:
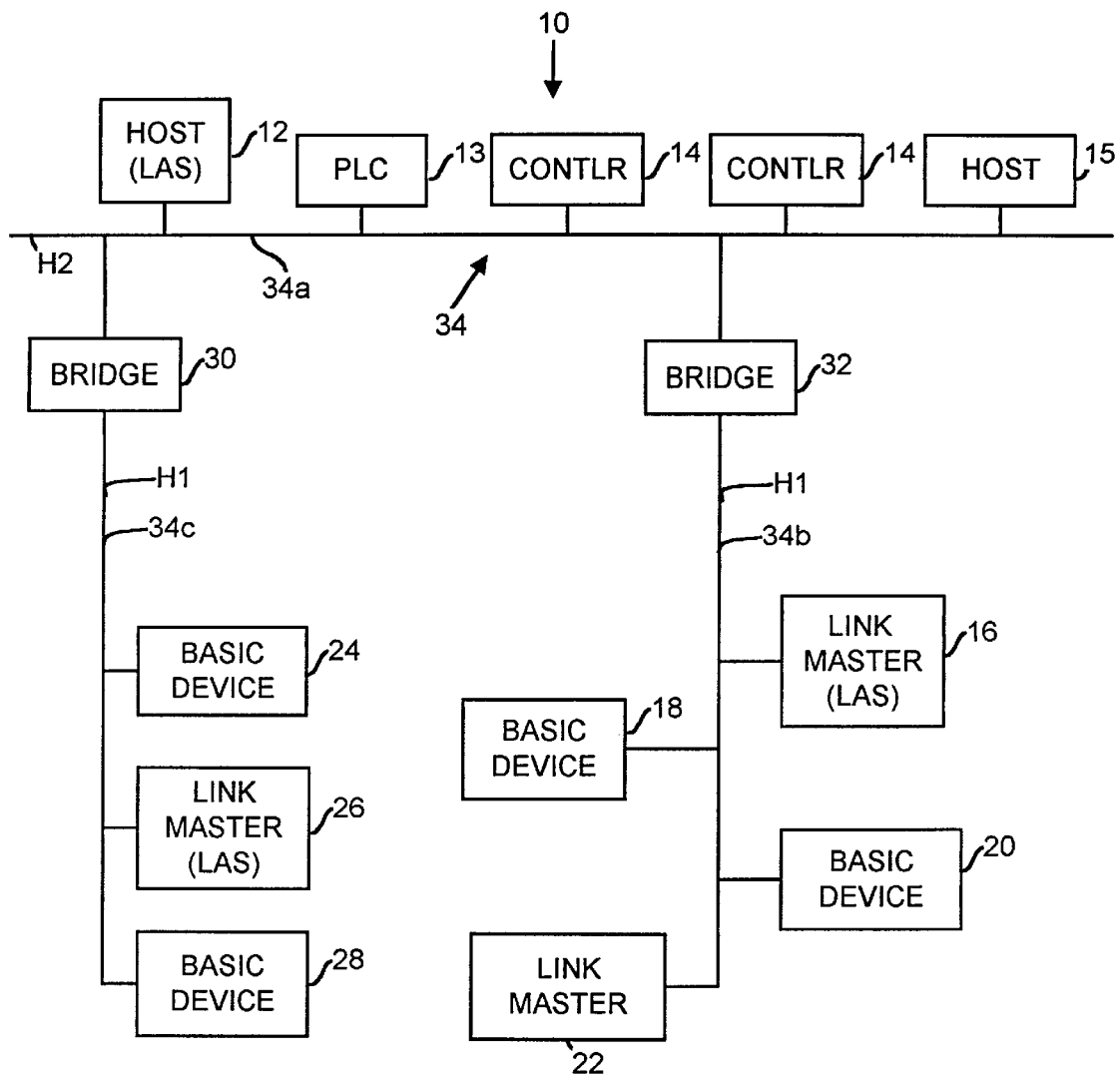
FIG. 1 is a schematic block diagram of an example process control network using the Fieldbus protocol.

While the schematic generator of the present invention is described in detail in conjunction with a process control network that implements process control functions in a decentralized or distributed manner using a set of Fieldbus devices, it should be noted that the schematic generator of the present invention can be used with process control networks that perform distributed control functions using other types of field devices and communication protocols, including protocols that rely on other than two-wire buses and protocols that support both analog and digital communications. Thus, for example, the schematic generator of the present invention can be used in any process control network that performs distributed control functions even if this process control network uses the HART, PROFIBUS, etc. communication protocols or any other communication protocols that now exist or that may be developed in the future.

Before discussing the details of the schematic generator of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new digital communication protocol developed for use in process control networks, this protocol is known in the art and is described in detail in numerous articles, brochures and specifications published, distributed and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby expressly incorporated by reference herein in their entirety.

Generally speaking, the Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because, the Fieldbus protocol enables control functions to be distributed throughout a process control network, it reduces the complexity of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30 and 32 via a two-wire Fieldbus loop or bus 34. The bus 34 includes different sections or segments, 34a, 34b, and 34c which are separated by bridge devices 30 and 32. Each of the sections 34a, 34b, and 34c interconnects a subset of the devices attached to the bus 34 to enable communications between the devices in a manner described hereinafter. Of course the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, receiving data generated by the field devices 16–32 and interfacing with one or more user terminals, which may be located in the host 12 or in any other device connected to the host 12 in any manner.

The bus 34 supports or allows two-way, purely digital communication and may also provide a power signal to any or all of the devices such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34a, 34b, and 34c, the Fieldbus protocol allows other device/wire topologies including point-topoint connections, in which each device is connected to a controller or host via a separate two-wire pair (similar to typical 4–20 mA analog DCS systems), and tree or "spur" connections in which each device is connected to a common point in a two-wire bus which may be, for example, a junction box or a termination area in one of the field devices within the process control network 10.

Data may be sent over the different bus segments 34a, 34b, and 34c at the same or different communication baud rates or speeds according to the Fieldbus protocol. For example, the Fieldbus protocol provides a 31.25 Kbit/s communication rate (H1), illustrated as being used by the bus segments 34b and 34c of FIG. 1, and a 1.0 Mbit/s and/or a 2.5 Mbit/s (H2) communication rate, which will be typically used for advanced process control, remote input/output and high speed factory automation applications and is illustrated as being used by the bus segment 34a of FIG. 1. Likewise, data may be sent over the bus segments 34a, 34b, and 34c according to the Fieldbus protocol using voltage mode signaling or current mode signaling. Of course the maximum length of each segment of the bus 34 is not strictly limited but is, instead, determined by the communication rate, cable type, wire size, bus power option, etc. of that section.

The Fieldbus protocol classifies the devices that can be connected to the bus 34 into three categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments and/or may take other actions necessary to link different segments of the bus 34. Bridge devices that connect bus segments which operate at different speeds must have link master capabilities at the lower speed segment side of the bridge. The hosts 12 and 15, the PLC 13, and the controllers 14 may be any type of fieldbus device but, typically, will be link master devices.

Each of the devices 12–32 is capable of communicating over the bus 34 and, importantly, is capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block, zero or more function blocks, and zero or more transducer blocks. These blocks are referred to as block objects.

A resource block stores and communicates device specific data pertaining to some of the characteristics of a Fieldbus device including, for example, a device type, a device revision indication and indications of where other device specific information may be obtained within a memory of the device. While different device manufacturers may store different types of data in the resource block of a field device, each field device conforming to the Fieldbus protocol includes a resource block storing some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA) and signal selector (SS) function blocks. However, other types of function blocks exist and new types of function blocks may be defined or created to operate in the Fieldbus environment. While the Fieldbus protocol defines function blocks in a particular way, the term function block as used herein is not so limited and refers to any block, processor, software, hardware, etc. configuration that performs a process control function.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Each block of a device is capable of operating differently in different modes and each function block is capable of generating alarm or event indications based on predetermined criteria. Generally speaking, blocks may operate in any number of different modes including, for example, an automatic mode in which, for example, the algorithm of a function block operates automatically; an operator mode in which the input or output of, for example, a function block, is controlled manually; an out-of-service mode in which the block does not operate; a cascade mode in which the operation of the block is affected by (determined by) the output of a different block; and one or more remote modes in which a remote computer determines the mode of the block.

Importantly, each block is capable of communicating with other blocks in the same or different field devices using standard message formats defined by the Fieldbus protocol over the Fieldbus bus 34. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO block as feedback to create a process control loop separate and apart from any DCS controller. In this manner, function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 on a periodic basis. Alert objects report alarms and events over the bus 34. These alarms or events may relate to any event that occurs within the device or one of the blocks of the device. View objects are predefined groupings of block parameters used in standard human/machine interfacing and may be sent to other devices for viewing on a periodic basis.

Figure 2:
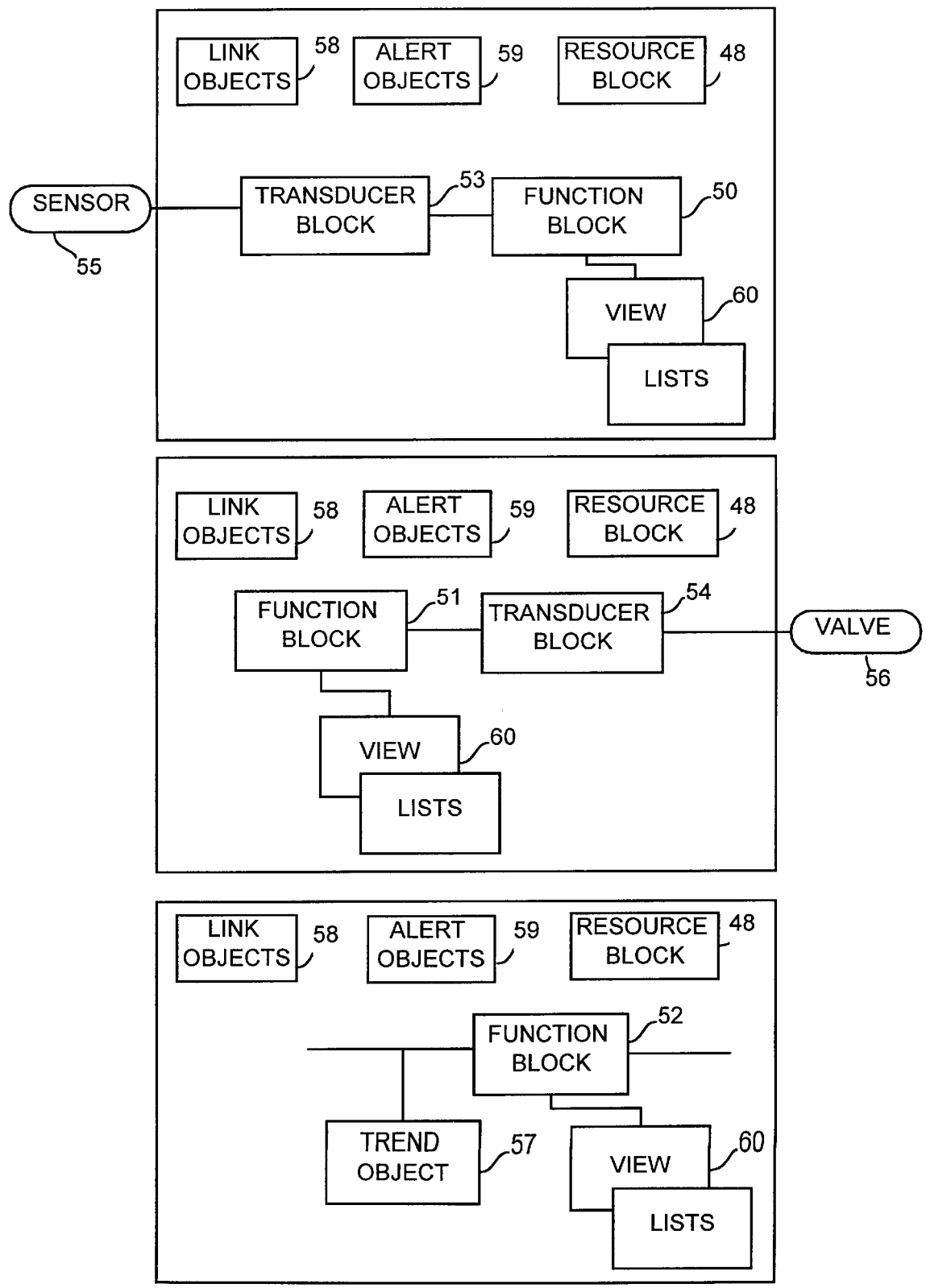
FIG. 2 is a schematic block diagram of three Fieldbus devices having associated function blocks therein.

Referring now to FIG. 2, three Fieldbus devices, which may be, for example, any of the field devices 16–28 of FIG. 1, are illustrated as including resource blocks 48, function blocks 50, 51, or 52 and transducer blocks 53 and 54. In the first device, the function block 50 (which may be an input function block) is coupled through the transducer block 53 to a sensor 55, which may be, for example, a temperature sensor, a set point indication sensor, etc. In the second device, the function block 51 (which may be an output function block) is coupled through the transducer block 54 to an output device such as a valve 56. In the third device, function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, the devices of FIG. 2 are merely exemplary and other numbers of and types of block objects, link objects, alert objects, trend objects, and view objects may be provided in any field device.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 6. There is no corresponding structure for OSI layers 3–5 in the Fieldbus protocol. However, the applications of a fieldbus device comprise a layer 7 while a user layer is a layer 8, not defined in the OSI protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link layer controls transmission of messages onto the bus 34 and manages access to the bus 34 according to a deterministic centralized bus scheduler called a link active scheduler, to be described in more detail below. The data link layer removes a preamble from the signals on the transmission medium and may use the received preamble to synchronize the internal clock of the field device with the incoming Fieldbus signal. Likewise, the data link layer converts messages on the communication stack into physical Fieldbus signals and encodes these signals with clock information to produce a "synchronous serial" signal having a proper preamble for transmission on the two-wire bus 34. During the decoding process, the data link layer recognizes special codes within the preamble, such as start delimiters and end delimiters, to identify the beginning and the end of a particular Fieldbus message and may perform a checksum to verify the integrity of the signal or message received from the bus 34. Likewise, the data link layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device, including human interface for functions such as calibration and diagnostics.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16 and 26) operates as a link active scheduler (LAS) which actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34b) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each function block active on any particular segment of the bus 34 and one or more asynchronous communications for one or more of the function blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. The execution times and the amount of time necessary to complete execution of each function block are stored in the management information base (MIB) of the device in which the function block resides while, as noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the field devices connected to the bus 34.

Thus, to effect communications during each macrocycle, the LAS, for example, the LAS 16 of the bus segment 34b, sends a compel data command to each of the devices on the bus segment 34b according to the list of transmit times stored in the link active schedule. Upon receiving a compel data command, a function block of a device publishes its output data on the bus 34 for a specific amount of time. Because each of the function blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data using a time-stamp.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Field devices are able to publish or transmit data and messages over the bus 34 using one of three virtual communication relationships (VCRs) defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgements, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

As noted above, the communication interconnections between the field devices and the blocks thereof are determined by a user and are implemented within the process control network 10 using a configuration application located in, for example, the host 12. However, after being configured, the process control network 10 operates and interfaces with the user via, for example, the host 12, without any of the devices connected to the bus 34 storing an overall configuration schematic that can be displayed to a user to enable the user to view the physical interconnections between the different devices on the bus 34, the blocks within each of the devices connected to the bus 34, the control loops implemented by different function blocks within the devices connected to the bus 34 or the timing of the communications on the bus 34.

To overcome this deficiency, a schematic generator is provided according to the present invention to generate one or more graphical schematics illustrating different views of the process control network 10 to thereby depict the current configuration of the process control network 10. In particular, the schematic generator according to the present invention may provide a maintenance schematic illustrating the physical layout of the devices within the process control network 10, a control loop schematic illustrating the interconnections forming different process control loops within the process control network 10, and one or more communication or timing schematics illustrating the timing of or other information pertaining to the communication occurring on the bus 34 of the process control network 10. The schematic generator of the present invention may also allow a user to switch between different views or schematics for further versatility. Of course, the schematic generator of the present invention may be implemented in software, firmware, or hardware located in any link master device connected anywhere on the bus 34, such as one of the hosts 12 or 15, the PLC 13, the controllers 14, etc. and may be configured to generate a schematic on any graphical display connected to any device attached to the bus 34, such as a display device associated with the host 12.

Figure 3:
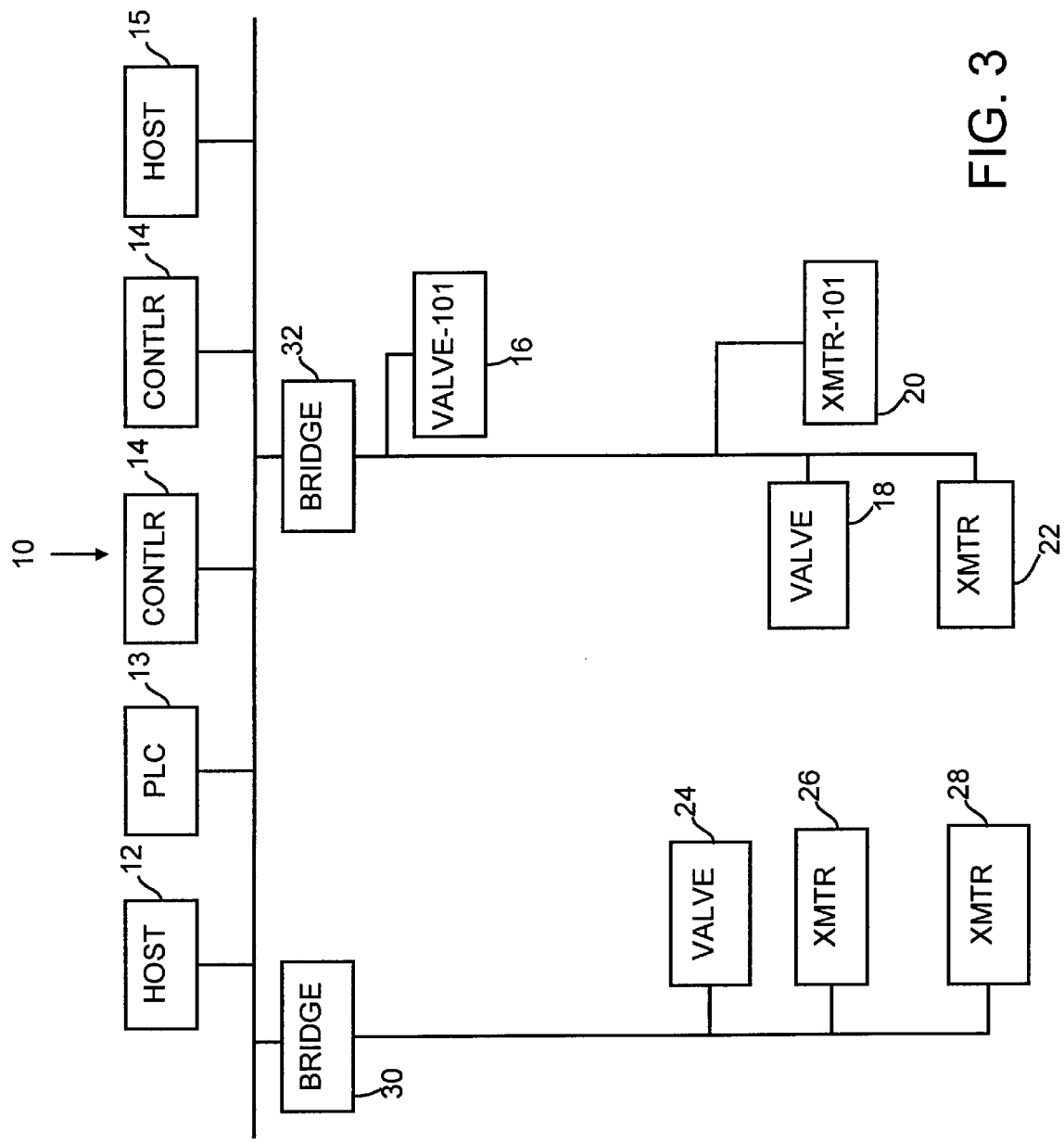
FIG. 3 is a maintenance schematic developed according to the present invention for the process control network of FIG. 1.

As noted above, a schematic generator according to the present invention produces a maintenance schematic illustrating and identifying the devices connected to the bus 34 and the physical interconnections between those devices. The schematic generator may, for example, produce a maintenance schematic such as that illustrated in FIG. 3 which depicts the manner in which the devices within the process control network 10 of FIG. 1 are interconnected on the bus 34. The maintenance schematic produced according to the present invention may also identify each of the devices by, for example, displaying information pertaining to the devices (such as a device type, revision number, manufacturer, I.D. number, etc.). Likewise, if desired, the devices may be depicted with fanciful or informative pictures that are easily recognizable as particular types of devices. As illustrated in FIG. 3, the devices 16, 18, and 24 are valves while the devices 20, 22, 26, and 28 are transmitters. If desired, the maintenance schematic may illustrate the physical interconnections between all of the devices within the process control network 10 or any subset of devices, such as those connected to any one segment of the bus 34.

To generate a maintenance schematic, such as the one illustrated in FIG. 3, the schematic generator may obtain or read the live list stored in one or more of the link master devices connected within each segment of the bus 34 to identify the devices attached to those segments and may then use that information to retrieve device specific information pertaining to the identity, type, etc. of each of the devices on the bus 34. This identity data is stored or referred to in, for example, the resource block and/or transducer blocks of each of the devices on the bus 34. The schematic generator may then use this information to create and display the maintenance schematic. Of course, the schematic generator may communicate with each of the devices on the bus 34 using standard communication formats or messages to retrieve the necessary information stored within the devices and may communicate through bridge devices (such as devices 30 and 32) as required. Also, the schematic generator may store a series of images for standard devices and, upon identifying or recognizing a device type (which may be indicated in a transducer block or a device description within a device), retrieve the image for that device type for use in creating the maintenance schematic.

Figure 4:
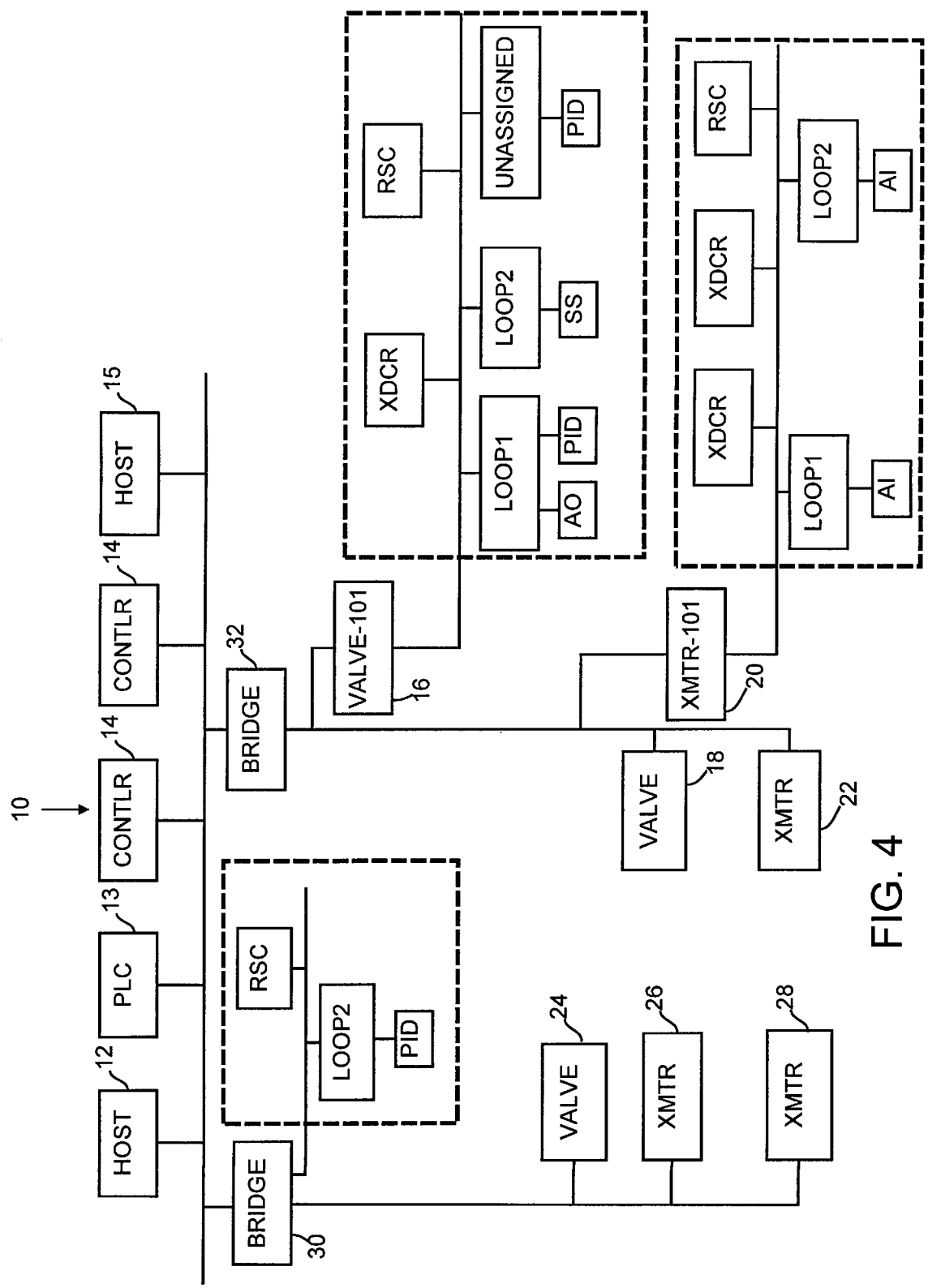
FIG. 4 is an expanded maintenance schematic developed according to the present invention for the process control network of FIG. 1.

The schematic generator may also obtain and display information pertaining to each of the blocks and/or objects associated with any one or all of the devices connected within the process control network 10 when a user selects a displayed device by, for example, double clicking on that device in a windows-type display environment. The maintenance schematic of FIG. 4 is the same as that of FIG. 3, except the user has opened or selected the valve 16, the transmitter 20 and the bridge 30 to view the blocks associated with each of those devices. Thus, as illustrated in the maintenance schematic of FIG. 4, the valve 16 includes a resource (RSC) block, a transducer (XDCR) block, and a number of function blocks including an analog output (AO) function block, two PID function blocks, and a signal select (SS) function block. The transmitter 20 includes a resource block, two transducer blocks, and two analog input (AI) function blocks while the bridge 30 includes a resource block and a PID function block. Furthermore, the control loops in which the function blocks of the valve 16, the transmitter 20, and the bridge 30 are located are identified by connecting each of these function blocks to an indication of a loop number in which that function block is connected. Thus, as illustrated in FIG. 4, the AO function block and one of the PID function blocks of the valve 16 and one of the AI function blocks of the transmitter 20 are connected within a control loop indicated as LOOP1, while the SS function block of the valve 16, the other one of the AI function blocks of the transmitter 20, and the PID function block of the bridge 30 are connected in a control loop indicated as LOOP2. The other PID function block of the valve 16 is not connected within any control loop and is therefore marked with an UNASSIGNED loop indication.

Preferably, the maintenance schematic generator provides a list of all unassigned function blocks present in any particular device and/or a list of all of the unassigned function blocks within all of the devices within the process control network 10 or any bus segment thereof when requested to do so by the user. Such a list is beneficial in helping the user to implement new control functions with devices already connected within a process control network. Also, the maintenance schematic generator may produce a trend and alarm report that identifies the function blocks or devices that generate alarm and event notifications and trend reports and the function blocks receiving that information. The display of trend, alarm, and event communications is highly advantageous for debugging control system interconnections because misdirection of trend, alarm, and event signals is difficult to detect.

Of course, the information pertaining to the identity and description of the function blocks within any of the devices may be obtained by polling a device for that information using standard Fieldbus messages (or other messages in systems using other protocols). This information is readily available from the VFDs of the devices and, in some cases, may be obtained from the device description of the device (a user interface database provided for each device by the device manufacturer). However, the information identifying which, if any, control loop each function block is connected within and the destinations of alarm, event, and trend data must be ascertained by analyzing data stored within each device identifying the input and output linkages or connections between each of the blocks of that device and blocks of that or other devices, as will be described in more detail hereafter.

In general, the maintenance schematics of FIGS. 3 and 4 are beneficial in enabling a user to quickly and simply determine the physical layout of the process control network, the number, types, and identification of the devices connected within the process control network, the number and type of function and transducer blocks within any particular device, the control loop in which the function block of any device is used, and the unused or unassigned function blocks connected within the process control network. Also, using the maintenance schematic of FIG. 4, an operator or engineer may quickly determine which of the control loops of the process control network 10 will be shut down upon removing or replacing a particular one of the devices.

Figure 5:
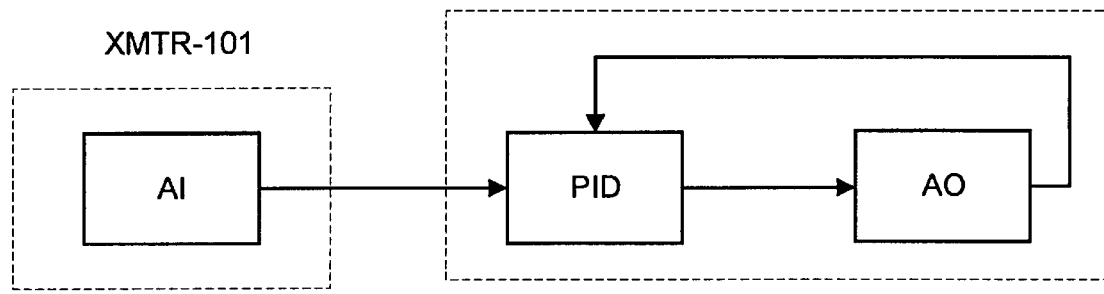
FIG. 5 is a control loop schematic developed according to the present invention for a control loop within the process control network of FIG. 1.

The schematic generator of the present invention also generates a control loop schematic illustrating one or more of the control loops formed by the interconnections of different function blocks within the process control network 10. Such a control loop schematic may take the form of that of FIG. 5, which illustrates a simple control loop (LOOP1) formed by the AO function block and the PID function block of the valve 16 and one of the AI function blocks of the transmitter 20 (FIG. 4). The control loop schematic of FIG. 5 illustrates the interconnections between these function blocks using lines attaching the process and control inputs and outputs of these function blocks. Thus, as illustrated in FIG. 5, the output of the AI function block is connected to the input of the PID function block which has an output connected to an input of the AO function block. Likewise, the output of the AO function block is connected to a control input of the PID function block. Of course the connections indicated by the lines in a control loop schematic may be performed internally within a field device when, as with the case of the AO and the PID function blocks of FIG. 5, the function blocks are within the same field device, or these connections may be implemented over the two-wire communication bus 34 using standard Fieldbus communications.

As also illustrated in FIG. 5, the control loop schematic generator may indicate using, for example, dotted lines, the device in which each of the function blocks within the control loop resides. Thus, the AI function block of FIG. 5 resides in the transmitter-101 (the transmitter 20 of FIGS. 3 and 4) while the PID and the AO function blocks reside in the valve-101 (the valve 16 of FIGS. 3 and 4).

Figure 6:
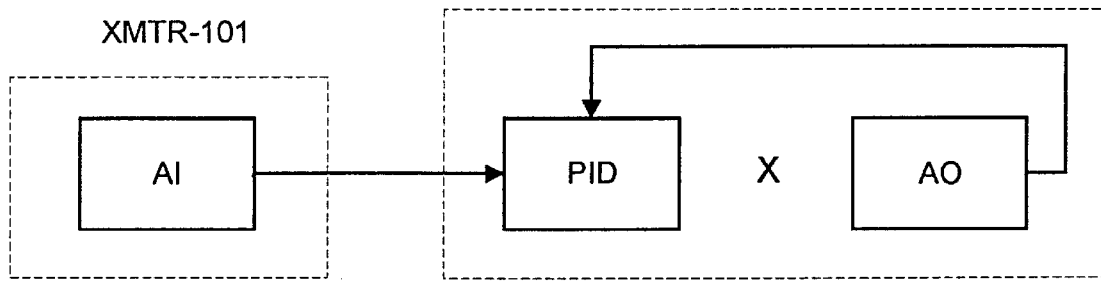
FIG. 6 is a control loop schematic developed according to the present invention illustrating a connectivity conflict in a control loop within the process control network of FIG. 1.

Still further, the schematic generator may indicate any connectivity conflicts that exist with respect to any control loop. A connectivity conflict exists when a function block has an input, an output, or a control connection that must necessarily be connected for execution, but that has no corresponding connection with another function block. A connectivity conflict may also occur when multiple conflicting function blocks are connected to an input, an output, or a control connection of a particular function block and thereby form a mutually-inconsistent connectivity condition. The control loop schematic of FIG. 6 illustrates a connectivity conflict (marked with an "X") existing between the PID and the AO function blocks of the control loop illustrated in FIG. 5. Of course connectivity conflicts (or potential connectivity conflicts) may be marked or displayed in any desired manner on the control loop schematic.

A control loop schematic, such as that in FIG. 5, is useful when looking for bugs in a control configuration and in determining the manner in which control loops are actually implemented in the process control network. Furthermore, if desired, the schematic generator may display block parameters or other information pertaining to a function block within the control loop schematic when, for example, a user selects that block in some manner, such as by double clicking the block in a windows-type display environment.

Figure 7:
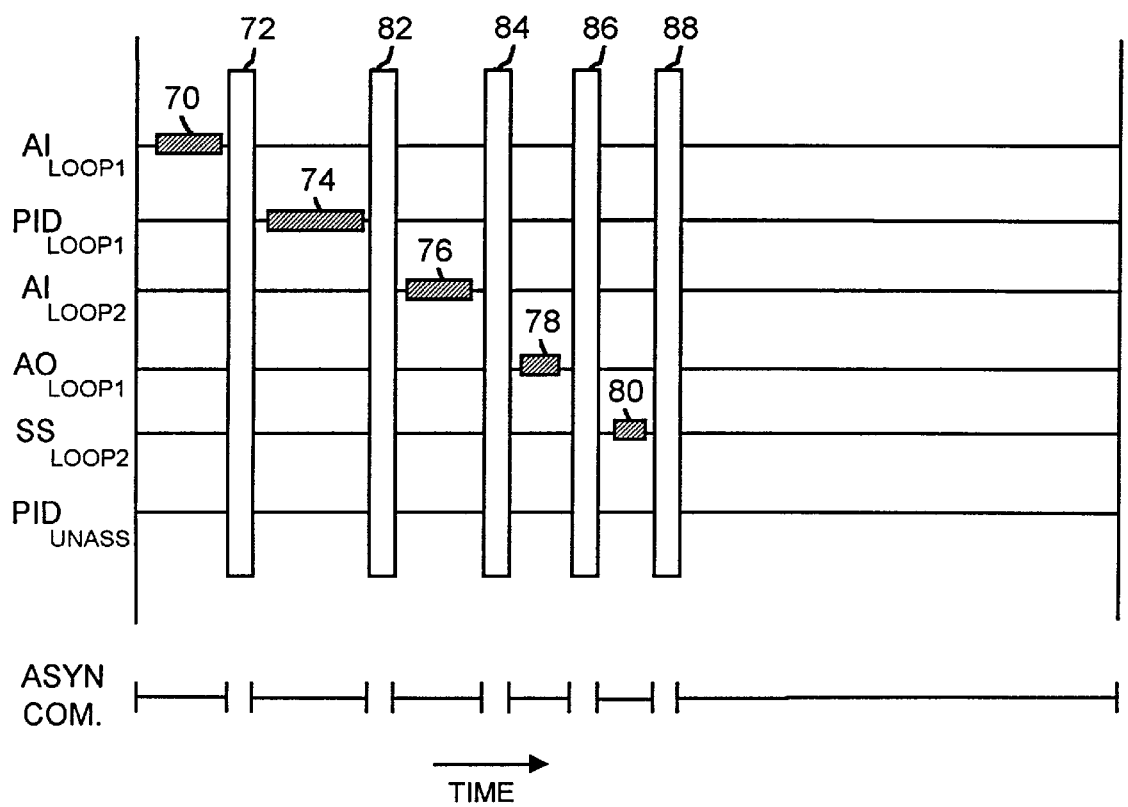
FIG. 7 is a timing schematic developed according to the present invention for a segment of a bus of the process control network of FIG. 1.

The schematic generator of the present invention also produces one or more communication or timing schematics to illustrate the amount of and the timing of communications occurring on the bus 34 or any segment thereof. FIG. 7 illustrates a timing schematic that depicts the times at which function blocks on the bus segment 34b execute during each macrocycle and the times at which synchronous communications occur during each macrocycle associated with the bus segment 34b. In the timing schedule of FIG. 7, time is indicated on the horizontal axis and activities associated with the different function blocks of the valve 16 and the transmitter 20 (of FIG. 4) are illustrated on the vertical axis. The control loop, in which the function blocks operate, is identified in FIG. 7 as a subscript designation. Thus $AI_{LOOP1}$ refers to the AI function block of the transmitter 20 connected in the control loop indicated as LOOP1, $PID_{LOOP1}$ refers to the PID function block of the valve 16 connected in control loop indicated as LOOP1, etc. The block execution time of each of the illustrated function blocks is depicted by a cross-hatched box while each scheduled synchronous communication is identified by a vertical bar in FIG. 7.

Thus, according to the timing schedule of FIG. 7, during any particular macrocycle of the segment 34b (FIG. 1), the $AI_{LOOP1}$ function block executes first for the time period specified by the box 70. Then, during the time period indicated by the vertical bar 72, the output of the $AI_{LOOP1}$ is published on the bus segment 34b in response to a compel data command from the LAS for the bus segment 34b. Likewise, the boxes 74, 76, 78, and 80 indicate the execution times of the function blocks $PID_{LOOP1}$, $AI_{LOOP2}$, $AO_{LOOP1}$, and $SS_{LOOP2}$, respectively (which are different for each of the different blocks), while the vertical bars 82, 84, 86, and 88 indicate the times that the function blocks $PID_{LOOP1}$, $AI_{LOOP2}$, $AO_{LOOP1}$, and $SS_{LOOP2}$, respectively, publish data on the bus segment 34b. As can be seen, the unassigned PID function block of the valve 16 is not scheduled for execution during the macrocycle.

As will be apparent, the timing schematic of FIG. 7 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block. If desired, the actual times (e.g., the offset times) associated with any of the block execution or publishing periods can be displayed on the timing schematic in any desired manner. Likewise, the entire amount of time associated with a macrocycle, the amount of time available for asynchronous communication, and/or the amount of time associated with any or all synchronous communications may be indicated in any desired manner on the timing schematic.

While the timing schematic of FIG. 7 is useful in viewing the execution times and sequence for the different function blocks as well as the time and order that each function block is scheduled to communicate synchronously over the bus 34, it is also useful for determining timing conflicts, which may occur when more than one function block is scheduled to publish data on the bus 34 at the same time, when more than one function block executes at the same time or when the end of the execution time for a function block is later than the beginning of the time that the same function block is scheduled to publish data on the bus 34. These conflicts can be indicated in the timing schematic by an overlap of two vertical bars (when multiple function blocks are scheduled to publish at the same time or at overlapping times), by an overlap of a cross-hatched box and a vertical bar (when a block is scheduled to execute during the time in which that or a different block is scheduled to publish synchronous data on the bus 34), or by two or more cross-hatched boxes having portions directly above or below one another (when two function blocks are scheduled to execute at the same time). These timing conflicts may be indicated by highlighting, coloring, marking (as with dotted lines), or otherwise indicting the overlapping portions of the boxes and bars, or in any other desired manner. Of course, a user may use the timing schematic to detect timing conflicts and then change the control scheme of the process control network to eliminate detected timing conflicts.

Figure 8:
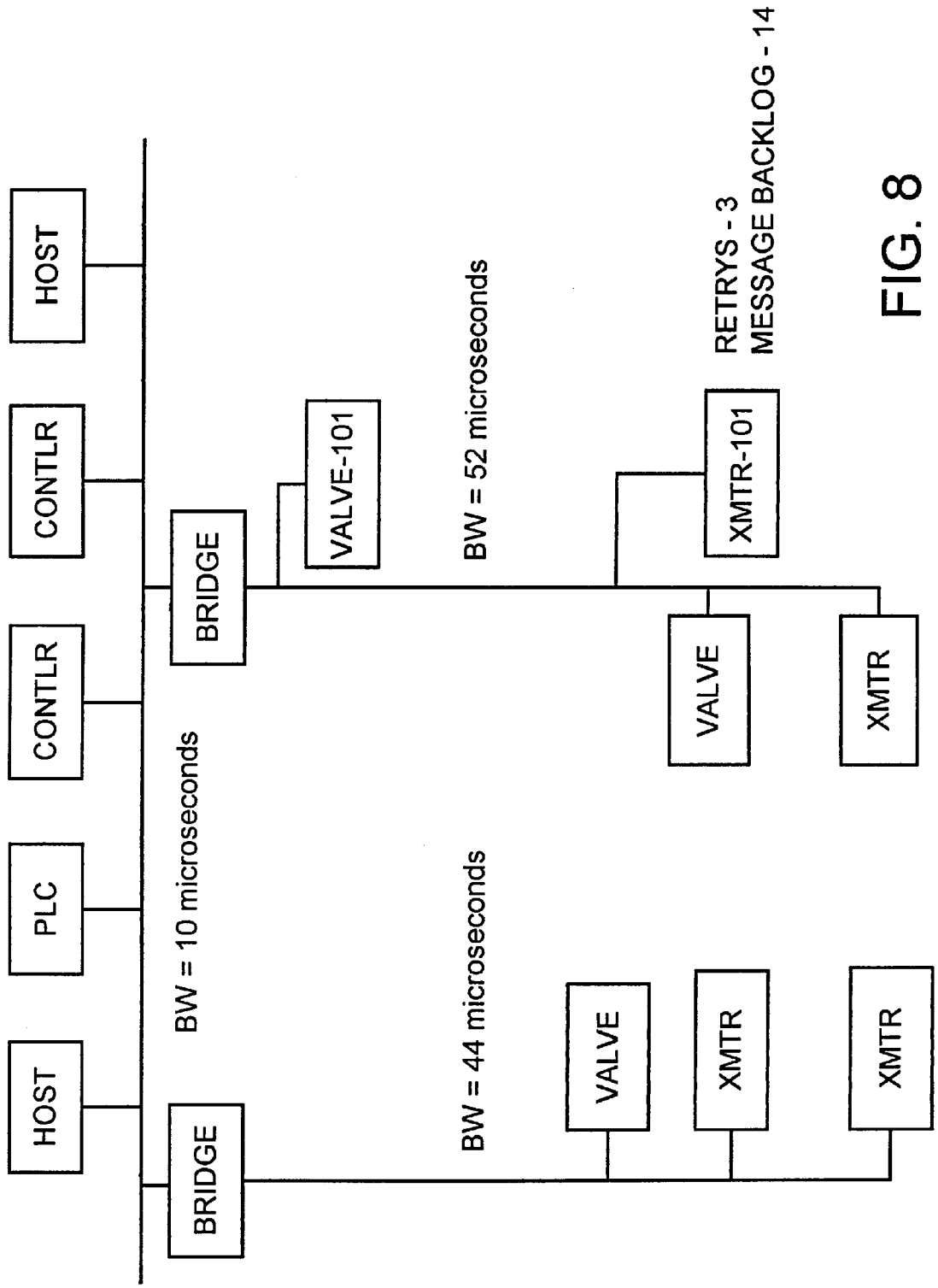
FIG. 8 is a communication schematic developed according to the present invention for the process control network of FIG. 1.

The schematic generator of the present invention may also generate a communication schematic that illustrates the communication occurring on the entire bus 34 or on any particular segment of the bus 34. Such a communication schematic can be used to enable an operator or engineer to ascertain which segments of the bus 34 are being under-utilized or over-utilized and, therefore, to which bus segments new devices can be advantageously attached without upsetting communications on the bus 34 or causing data flow bottlenecks within the bus 34. Such a communication schematic is illustrated in FIG. 8 for the process control network of FIG. 1 and depicts the physical interconnections between the devices and the bus segments associated with the process control network 10. For each of the bus segments 34a, 34b, and 34c, the communication schematic provides an indication of the unused bandwidth (BW) on that segment. This bandwidth indication may include the amount of time currently available for asynchronous communication during each macrocycle (as illustrated in FIG. 8), the ratio of the synchronous to asynchronous communication times during each macrocycle, the amount of time during which no blocks are executing during each macrocycle, or any other indication of the "busyness" or types and amount of communications occurring on each segment of the bus 34. This bandwidth information is useful when adding new devices to the bus 34 or when determining operating conditions on the bus, including observing the "health" or busyness of the devices and the bus segments within a process control network.

The communication schematic may also allow a user to view specific statistical device communication data including, for example, whether a device is LAS capable or not, the number of retries currently associated with a device (i.e., the number of times the device had to send a message before receiving an indication that the message was received), the invalid message count of the device, and/or the message backlog of the device, all of which are stored within the device and may be easily recovered from the device through a data query. Of course other parameters might also be displayed in response to, for example, a user selecting one of the devices within the communication schematic.

Moreover, the schematic generator may allow a user to go from any of the maintenance schematic, the control loop schematic, the timing schematic, or the communication schematic to any of the other schematics in any desired or convenient manner. Thus, for example, by selecting (e.g., double clicking) one of the loop indications in the maintenance schematic (FIGS. 3 and 4), the schematic generator may automatically create the control loop schematic for the selected loop indication. Likewise, selecting a bus segment indication in the maintenance schematic (FIGS. 3 and 4) or in the communication schematic (FIG. 8) may cause the schematic generator to display the timing schematic for that bus segment. Also, selecting a device name in the control loop schematic (FIG. 5) may cause the schematic generator to display the maintenance schematic illustrating that device. Of course other schematic interconnections may also or alternatively be used.

Figure 9A:
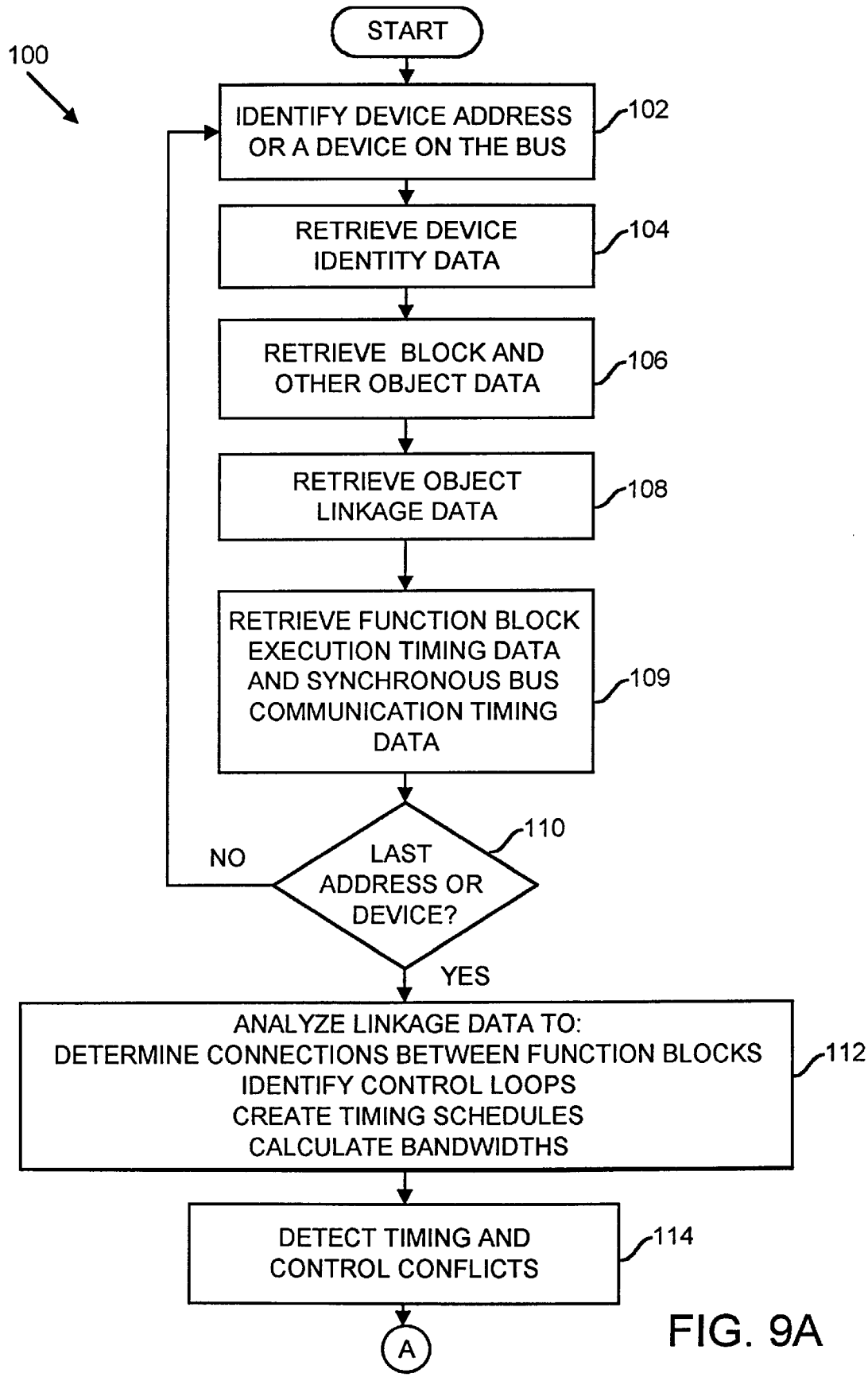
FIGS. 9A and 9B comprise a flowchart illustrating the operation of one embodiment of the schematic generator of the present invention.
Figure 9B:
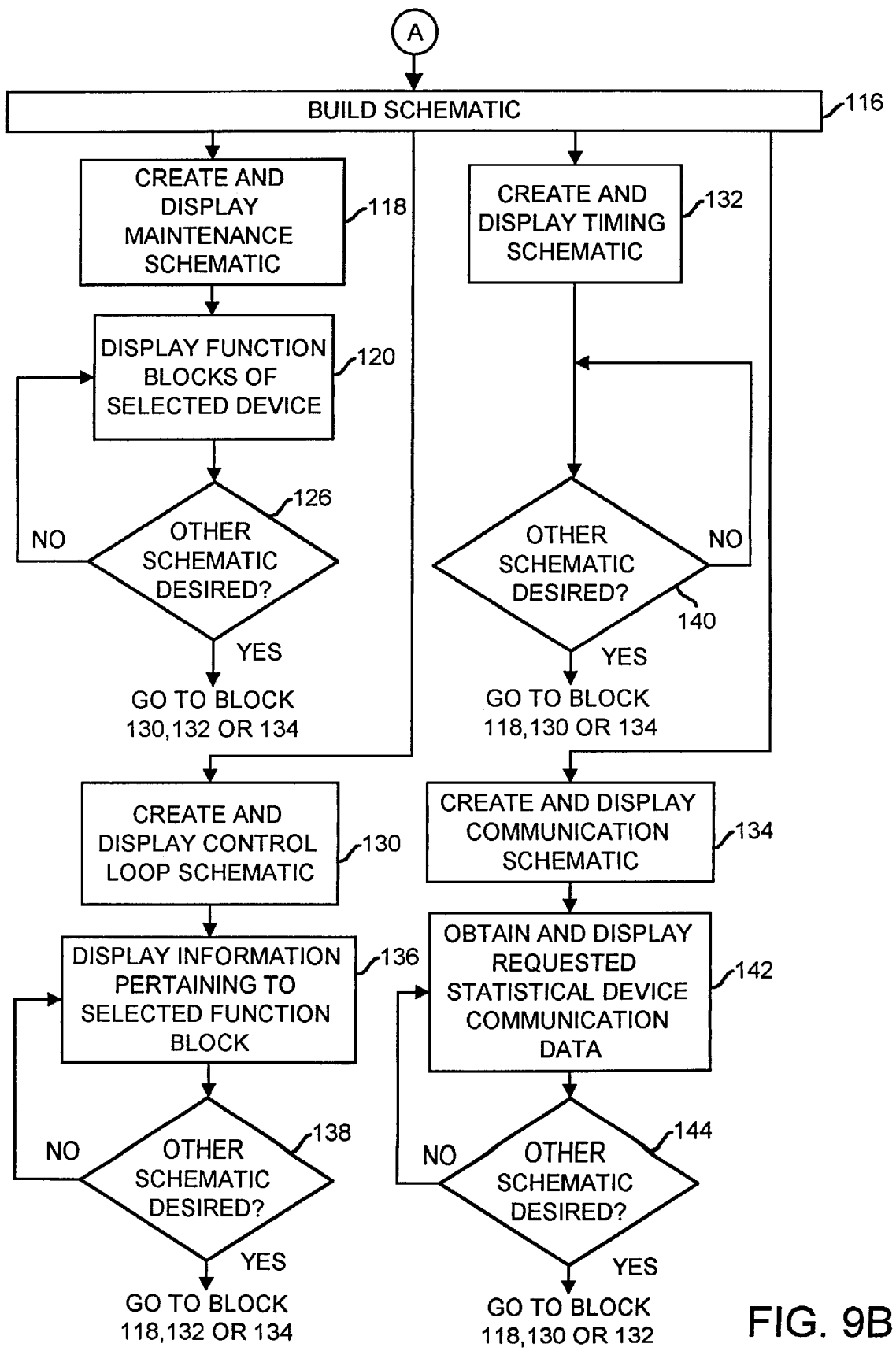

Referring now to FIGS. 9A and 9B, the steps performed by a schematic generator 100 capable of producing one or more of the maintenance, control loop, timing, and/or communication schematics described above are illustrated in detail. While the schematic generator 100 is preferably implemented in software, it may also be implemented in hardware, firmware, etc., as desired. If implemented in software, the schematic generator may be stored in any computer readable memory such as on a magnetic disk, a laser disk, or other storage medium, in a RAM or ROM of a computer, etc. Likewise, this software may be delivered to a user using any desired method including, for example, over a communication channel such as a telephone line, the internet, etc.

Generally speaking, the schematic generator 100 interrogates each of the devices connected within a process control network to retrieve linkage data from these devices and, upon receiving the requested data, analyses the linkage data to create a maintenance, control loop, timing, and/or communication schematic, such as those of FIGS. 3–8. The linkage data may be any data stored in the devices (or in another linkage database anywhere within the process control network) that indicates the manner in which the devices are interconnected and configured to operate within the process control network. The linkage data may include, for example, device and block identification information and description data, data indicating function block execution times and scheduled function block communication times, device and block communication connections, alarm, trend, and event report destinations, as well as other information stored in or associated with each of the devices in the process control network. While the schematic generator 100 is described herein as using known Fieldbus protocol commands to retrieve information from Fieldbus devices, the schematic generator 100 may use any other commands associated with any other communication protocol associated with any desired communication network, including any process control network, to retrieve the desired information from devices supporting that communication protocol and may retrieve the desired identity, description, configuration, and timing information from the individual devices in a communication network differently, depending on the way in which that information is stored in the devices (or other databases) within the communication network.

When the schematic generator 100 is initiated, a block 102 (FIG. 9A) identifies an address at which a device is connected to the bus 34 or some other indication of a device connected to the bus 34 (such as a tag). If desired, the block 102 may sequentially interrogate each of the addresses on the bus 34 to determine the addresses at which devices are connected or, alternatively, the block 102 may use one or more of the live lists stored in the link master devices of the process control network 10 to determine the addresses at which devices are connected to the bus 34. When the block 102 identifies an address or other identifier indicating that a device is connected to the bus 34, a block 104 interrogates that device to retrieve information pertaining to the identity of that device, such as a device I.D., device revision number, a device tag (to the extent one is used), etc. In a Fieldbus device, device identification information is generally available from the resource block and one or more transducer blocks of the device. Furthermore, the block 104 may retrieve device identification information from the device description information stored within each device in any known manner, such as by using device description services, which are known in the art. The block 104 stores the retrieved device identity data after receiving this data.

Next, a block 106 interrogates the device to retrieve and then store information pertaining to the internal components of that device, such as the number and types of block objects (e.g., function blocks and transducer blocks), alert objects, trend objects, etc. associated with the device. This information is available in and may be retrieved from the VFDs and link objects of the device. Thereafter, a block 108 interrogates the device to retrieve and store information pertaining to the interconnections between each of the objects or blocks (such as the function blocks) within the device and other function blocks within that device as well information pertaining to the interconnections between each of the objects or blocks within that device and other devices. This interconnection information or communication linkage data is stored within data structures within the device and, particularly is stored within Fieldbus devices in the link objects, the VFDs, and the MIBs of each device in known manners. In particular, as is known, function block link objects designate (by, for example, addressing) VCRs used to access, distribute, or exchange individual objects or object parameters. In this manner, function block link objects define the association between input parameters of a function block and output parameters of another function block within the same or a different device as well as defining alert notifications and trend information reports to be delivered to other devices. As is also known, the VCRs of each device identify the address(es) designated to receive a communication. The address(es) designated by a VCR may be internal to the device (i.e., another link object of that device) or external to the device, in which case the VCR identifies a VCR in a different device. Because the way in which link objects and VCRs are stored and implemented in Fieldbus devices is known to those skilled in the art, these objects and VCRs will not be describe further herein. If desired, however, complete information pertaining to the way in which linkage data is stored in and may be retrieved from a Fieldbus device is described in detail in the Communications Technical Specification and User Layer Technical Specification.

Next, a block 109 retrieves and then stores information pertaining to the scheduled start time for execution of each of the function blocks within the device (stored in the MIB of a device) and the amount of time that each function block takes to execute (stored in the VFD of a device). Furthermore, if the device is an LAS, the block 109 retrieves and stores data indicating the times that the LAS is scheduled to issue compel data commands to the different devices on the bus 34 (the link active schedule) as well as the length of time that each device controls the bus 34 (or a segment thereof) in response to a compel data command. This timing information is stored in and may be retrieved from the MIB of the LAS device.

As will be understood, the blocks 102, 104, 106, 108, and 109 may interrogate the devices on the bus 34 using any standard messages, such as standard Fieldbus messages in a Fieldbus process control network, to obtain the information necessary for determining device and function block identity, configuration and timing information. Of course, some of the information associated with a particular device or function block may be accessed simply by making a request and receiving a response to the request. Other information is obtained through analysis of a series of requests and responses and may be attained by requesting, for example, an index that supplies the location of the desired information, rather than accessing the information directly. Thus, for example, the block 108 may need to access information within the link object, the VCRs, and/or other communication identifiers associated with one or more of the function blocks of a device to retrieve all of the linkage data necessary to identify the communication connections that exist between the function blocks within a device and other devices. In any event, interrogation activities relating to function block information or other linkage data can be varied depending on the description and indexing schemes used by different bus standards or structures.

If, at a block 110, the last address of the bus 34 or the last device on the live list has not been interrogated, control is returned to the block 102 which identifies another address or device. Otherwise, the block 110 provides control to a block 112. While the block 102 may be configured to interrogate all of the devices connected to the bus 34, it may, instead interrogate any subset of those devices such as the devices on a particular segment or part of a segment of the bus 34.

The block 112 analyses the retrieved linkage data to determine the input and output connections or linkages between each of the function blocks within the process control network 10. In some cases, linkages between function blocks are determined directly by, for example, matching an output designation of an upstream function block to an input designation of a downstream function block. In some cases, however, some analysis of linkage data is necessary to recreate the linkages between function blocks. For example, the block 112 may need to map the link objects for each block parameter (such as a block output) to a VCR address, use the data at that VCR address to determine which VCR of a different device is scheduled to receive the output data and then identify the internal link object associated with the second VCR to identify the receiving function block and, thereby, to connect the function block output in the first device to a function block input in a different device.

Of course the block 112 may analyze the information attained during the operations of blocks 102–109 in a systematic manner to map the connections between all of the function blocks in the process control network 10 (or any portion thereof) and to determine the destinations of alerts (alarms), events, and trends for each function block having alert, event, and trend objects associated therewith. For example, the block 112 may begin the connectivity analysis by analyzing the output function blocks of the process, determining the upstream blocks making connections to the input connections of the output function blocks (using the link objects, VCRs, etc.) and progressing further upstream to the ultimate input blocks of the process control network. At any time during this procedure, the block 112 may analyze the input and output parameter connections of the various function blocks to determine the name, device number, identification, tag, address, VCR, or other parameters of these function blocks in order to be able to determine the connections between different function blocks and for future display in a schematic. Furthermore, if necessary, the VCRs of multiple devices may be compared to determine the interconnections between devices and to determine which of the devices/function blocks are publishers of data and which devices/function blocks are subscribers of data. These publisher/subscriber relationships, in addition to other connectivity information including alarm and trend information are used to determine all of the interconnections between the inputs and outputs of all or some portion of the blocks or other objects within the process control network 10.

During, or at the end of this connectivity analysis, the block 112 identifies and marks the different control loops present in the process control network 10 by determining subsets of function blocks, wherein all of the function blocks in one subset are connected to at least one other function block in the same subset and wherein none of the function blocks in one subset is connected to any function block of a different subset. Each of these subsets corresponds to a different control loop and may be labeled by the block 112 with a unique identifier. Thereafter, the block 112 identifies the function blocks that are not connected to any other function blocks (each subset of one function block) and, if these function blocks are not scheduled to execute, identifies these function blocks as unassigned function blocks. Of course the block 112 stores all the connectivity information including the control loop identifications, the unassigned function blocks, and the interconnections between each of the function blocks in memory in any desired manner.

Still further, the block 112 uses the retrieved timing information to create the function block execution and synchronous communication schedules for each segment of the bus 34 to be displayed by the timing schematic (FIG. 7). Also, the block 112 calculates any desired bandwidth measurements for each segment of the bus 34 from the retrieved timing information and stores these calculations for future use.

Next, a block 114 detects the various types of conflict conditions existing within the process control network including, for example, connectivity and timing conflicts. Connectivity conflicts may be detected by looking for input, output, or control connections within each function block of each identified control loop that are not connected to any other function block or for multiple input, output, and control connections being connected to a single function block input, and then determining whether such a connection is allowed using, for example, information provided in each device or in a stored list containing acceptable connection configurations for different types of function blocks. Likewise, timing conflicts may be determined by ascertaining the start and end times of each block execution period and synchronous data communication period of each macrocycle and determining if any of these times overlap, i.e., if the start time of any of the block execution periods or the synchronous communication periods begins before the end time of any other previous block execution period or synchronous communication period, or if the end time of any of the block execution periods or the synchronous communication periods occurs after the start time of any other later block execution period or synchronous communication period. The block 114 stores any detected connectively and/or timing conflicts in memory for future use.

Next, a block 116 (FIG. 9B) determines which type of schematic the user would like to view based on user input. If the user wishes to view a maintenance schematic, a block 118 constructs a maintenance schematic using the stored information pertaining to the way in which different devices are connected on the bus 34 and displays this schematic via any desired display mechanism, such as cathode ray tube (CRT), a printer, an LED or other flat panel display, etc. A block 120 then determines if the user selects any of the displayed devices or if an alarm or trend report is desired and, if so, displays the blocks within that device along with an indication of the loop that each function block is connected within, as illustrated for the valve 16, the transmitter 20 and the bridge 30 of FIG. 4, and/or provides an alarm or trend report associated with a block or a device.

Next, a block 126 determines if the user wishes to view a control loop schematic, a timing schematic, or a communication schematic and, if so, provides control to one of the blocks 130, 132, or 134, respectively. Otherwise control returns to the block 120.

If the user wishes to view a control loop schematic and indicates so by, for example, specifying a particular control loop at the block 116 or selecting a control loop indication while in the maintenance schematic at the block 126, the block 130 creates a control loop schematic, such as that illustrated in FIG. 3, for the specified control loop. To perform this function, the block 130 accesses and uses the connectivity information developed and stored by the block 112. During the creation of the control loop schematic, the block 130 may also display indications of any connectivity conflicts or potential connectivity conflicts identified by the block 114. Thereafter a block 136 determines if the user wishes to view any information pertaining to any of the function blocks, such as parameters of the function blocks or devices in which the function blocks are located and, if so, displays that information, which was obtained and stored by the block 106. A block 138 then determines if the user wishes to view a maintenance schematic, a timing schematic, or a communication schematic and, if so, provides control to one of the blocks 118, 132 or 134, respectively. Otherwise control returns to the block 136.

If the user wishes to view a timing schematic, such as that of FIG. 7, and indicates so by, for example, specifying a particular bus segment for which a timing schematic is desired at the block 116 or by selecting a bus segment while in the maintenance schematic, at the block 126, a block 132 creates a timing schematic for the selected bus segment using the timing information collected from the devices (including the LAS) by the block 109 and analyzed by the block 112. The block 132 also displays indications of timing conflicts identified by the block 114. Thereafter a block 140 determines if the user wishes to view a maintenance schematic, a control loop schematic, or a communication schematic and, if so, provides control to one of the blocks 118, 130 or 134, respectively. Otherwise control returns to the block 140.

If the user wishes to view a communication schematic such as that of FIG. 8 and indicates so at the block 116 or at the blocks 126, 138, or 140, the block 134 creates and displays a communication schematic using the device layout information obtained by the blocks 102 and 104 and the bandwidth information determined by the block 112. Thereafter a block 142 determines if the user wishes to view any statistical device communication information pertaining to any of the function blocks or devices, such as message backlog, retrys, etc. and, if so, polls the appropriate device for this data using standard message protocols. The block 142 then displays this information. If desired, the block 142 may take a number of samples of the statistical device communication information, such a message backlog and retry information, and may display the "worst case" number, an average number, etc. A block 144 then determines if the user wishes to view a maintenance schematic, a control loop schematic, or a timing schematic and, if so, provides control to one of the blocks 118, 130, or 132, respectively. Otherwise control returns to the block 142.

The schematic generator of the present invention is highly useful and advantageous for generating layout, control loop and timing schematics when documentation is otherwise unavailable. In addition. the schematic generator of the present invention may be used to debug a process loop even when connectivity is known from existing documentation.

While the schematic generator 100 has been illustrated herein as polling all of the devices for all of the desired information before determining connectivity and timing parameters and before creating any schematic from this information, the schematic generator 100 could poll the devices for only the information necessary to create a desired one of the schematics described herein and then create only that desired schematic. Also, the schematic generator 100 could determine interconnections between the devices during the time that it is polling those devices for information, instead of after all the information has been collected. Moreover, while the schematic generator 100 has been described herein as creating particular graphical displays to illustrate process, device, and control function identification, configuration, and timing information, a schematic generator according to the present invention may use other types of displays to illustrate the same or other process, device, and control function identification, configuration, and timing information. Likewise, while the schematic generator 100 has been described for use in a process control network using a Fieldbus protocol, a schematic generator according to the present invention can also be implemented in any other communication network such as a process control network that uses any other communication and/or configuration standard or protocol (that now exists or that may be developed in the future) as long as this standard or protocol provides for or allows control functions to be performed at distributed locations within a process. Also, while the schematic generator 100 has been described as being implemented in a process control network that uses a Fieldbus protocol and that, therefore, performs process control functions using Fieldbus "function blocks," the schematic generator of the present invention is not limited to use with networks that use what Fieldbus defines as a "function block" but may also be implemented in other networks (such as PROFIBUS networks) that use other types of devices or software to implement process control functions.

Thus, while the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A schematic generator for use with a process control network having a plurality of devices that communicate over a bus, wherein each of the devices is capable of performing a process control function and stores linkage data pertaining to the manner in which the devices are configured to operate within the process control network, the schematic generator comprising:

a device interrogator that interrogates each of the devices over the bus to retrieve the linkage data stored in each of the devices;

a data analyzer that analyses the retrieved linkage data to determine current process control configuration information; and a generator that creates a graphical schematic illustrating a current process control configuration of the process control network using the current process control configuration information.

2. The schematic generator of claim 1, wherein the linkage data stored in at least one of the devices comprises device physical connection data, wherein the data analyzer identifies physical interconnections between the devices and the bus, and wherein the graphical schematic comprises a maintenance schematic illustrating the physical interconnections between the devices and the bus.

3. The schematic generator of claim 2, wherein the linkage data stored in at least one of the devices further comprises device identity data, and wherein the generator includes means for displaying an indication of an identity of one of the devices on the maintenance schematic.

4. The schematic generator of claim 2, wherein the linkage data stored in at least one of the devices further comprises process control function data indicating one or more function blocks capable of being performed by the devices, wherein the data analyzer identifies a function block within the one of the devices, and wherein the generator further includes means for indicating the identified function block as being associated with the one of the devices on the maintenance schematic.

5. The schematic generator of claim 4, wherein the linkage data stored in at least one of the devices further includes function block communication data pertaining to the manner in which the function blocks are communicatively linked, wherein the data analyzer includes means for determining a control loop formed by communication links between the identified function block and one or more other function blocks within the process control network, and wherein the generator includes means for showing an indication of the determined control loop as being associated with the identified function block on the maintenance schematic.

6. The schematic generator of claim 5, wherein the data analyzer includes means for identifying an unassigned function block that is not communicatively linked to any other function block, and wherein the generator includes means for illustrating an indication of the unassigned function block.

7. The schematic generator of claim 1, wherein the linkage data stored in at least one of the devices comprises process control function data indicating function blocks capable of being performed by the devices and function block communication data pertaining to the manner in which the function blocks are communicatively linked, wherein the data analyzer includes means for identifying a control loop having a multiplicity of communicatively linked function blocks therein, and wherein the graphical schematic comprises a control loop schematic illustrating communication interconnections of the function blocks of the identified control loop.

8. The schematic generator of claim 7, wherein the identifying means includes means for determining a plurality of control loops formed by communicatively linked function blocks within the process control network.

9. The schematic generator of claim 8, wherein the data analyzer includes means for locating an unassigned function block that is not communicatively connected within any of the plurality of control loops, and wherein the generator includes means for illustrating an indication of the unassigned function block.

10. The schematic generator of claim 7, wherein the linkage data stored in at least one of the devices includes device identity data, and wherein the generator includes means for illustrating an indication of an identity of a device in which one of the communicatively linked function blocks in the identified control loop is located.

11. The schematic generator of claim 7, wherein the data analyzer includes means for finding a connectivity conflict in the identified control loop and the generator includes means for illustrating the connectivity conflict on the control loop schematic.

12. The schematic generator of claim 1, wherein the linkage data stored in at least one of the devices includes communication destination data related to destinations of one of alarm data, event data, and trend data associated with the devices, and wherein the generator includes means for displaying a list of the destinations of the one of the alarm data, the event data and the trend data associated with one of the devices.

13. The schematic generator of claim 1, wherein the linkage data stored in at least one of the devices comprises process control function data indicating function blocks capable of being performed by the devices, communication timing data indicating scheduled bus communications times for the function blocks and function block execution time data specifying execution times associated with the function blocks, wherein the data analyzer includes means for determining periods of time associated with the execution of each of a multiplicity of the function blocks and periods of time associated with scheduled bus communications for each of the multiplicity of the function blocks, and wherein the graphical schematic comprises a timing schematic illustrating the execution periods and the scheduled bus communication periods associated with each of the multiplicity of the function blocks.

14. The schematic generator of claim 13, wherein the data analyzer includes means for identifying timing conflicts associated with the execution periods and the scheduled bus communication periods, and wherein the schematic generator includes means for illustrating a determined timing conflict on the timing schematic.

15. The schematic generator of claim 1, wherein the linkage data stored in at least one of the devices comprises communication timing data associated with communications on the bus, wherein the data analyzer includes means for computing a bandwidth indication associated with a segment of the bus from the communication timing data, and wherein the graphical schematic comprises a communication schematic illustrating the bandwidth indication in conjunction with the bus segment associated with the bandwidth indication.

16. The schematic generator of claim 15, further including means for polling a selected device to retrieve statistical device communication data, and wherein the generator includes means for displaying the retrieved statistical device communication data on the communication schematic.

17. The schematic generator of claim 1, wherein the generator includes means for displaying multiple graphical schematics illustrating different types of process control configurations for a common element of the process control network and means for enabling a user to switch between the multiple schematics based on an indication of the common element.

18. A computer program product for use in a process control network having a bus, a plurality of devices capable of performing process control functions connected to the bus and a device linkage database that stores linkage data pertaining to the manner in which the devices are configured to operate within the process control network, the computer program product comprising:
 a computer useable medium having computer readable code therein including;
 a first routine that interrogates the linkage database to retrieve the linkage data pertaining to each of the devices;
 a second routine that analyses the retrieved linkage data to determine current process control configuration information; and
 a third routine that creates a graphical schematic illustrating a current process control configuration for the process control network using the current process control configuration information.

19. The computer program product of claim 18, wherein each of the devices includes a device database making up a portion of the linkage database and further including a fourth routine that controls the first routine to serially interrogate the device databases making up the linkage database to obtain the linkage data.

20. The computer program product of claim 18, wherein the linkage data comprises device identity data and process control function data indicating one or more function blocks capable of being performed by the devices, and wherein the graphical schematic comprises a maintenance schematic illustrating physical interconnections between the devices and illustrating the function blocks associated with one or more of the devices.

21. The computer program product of claim 20, wherein the linkage data further comprises function block communication data pertaining to the manner in which the function blocks of each device are communicatively linked to other function blocks within the process control network, wherein the second routine identifies a set of process control loops formed by the function blocks in the process control network, and wherein the third routine displays an indication of the process control loop with which one of the illustrated function blocks is associated.

22. The computer program product of claim 18, wherein the linkage data comprises process control function data indicating one or more function blocks capable of being performed by the devices and function block communication data pertaining to the manner in which the function blocks of each device are communicatively linked to other function blocks within the process control network, wherein the second routine identifies a set of process control loops formed by the function blocks in the process control network, and wherein the graphical schematic comprises a control loop schematic illustrating one of the identified process control loops.

23. The computer program product of claim 18, wherein the linkage data comprises process control function data indicating one or more function blocks capable of being performed by the devices, function block execution timing data and function block bus communication scheduling data, wherein the second routine determines the periods of time associated with the execution of each of a multiplicity of the function blocks and the periods of time associated with scheduled bus communications for each of the multiplicity of the function blocks, and wherein the graphical schematic comprises a timing schematic illustrating the execution periods and the scheduled bus communication periods associated with each of the multiplicity of the function blocks.

24. The computer program product of claim 18, wherein the linkage data comprises process control function data indicating one or more function blocks capable of being performed by the devices, function block communication timing data pertaining to the times that the function blocks communicate on the bus, wherein the second routine determines a bandwidth calculation associated with the communications occurring on a segment of the bus, and wherein the graphical schematic comprises a communication schematic illustrating the bus segment and the bandwidth calculation associated with the bus segment.

25. A method of generating a schematic in a process control network having a plurality of devices that communicate over a bus, wherein each of the devices is capable of performing a process control function and stores linkage data pertaining to the manner in which the device is configured to operate within the process control network, the method comprising the steps of:

interrogating each of the devices over the bus to retrieve the linkage data stored in each of the devices;

analyzing the retrieved linkage data to determine current process control configuration information; and creating a graphical schematic illustrating a process control configuration of the process control network using the determined current process control configuration information.

26. The method of claim 25, wherein the linkage data stored in at least one of the devices comprises device identity data and process control function data indicating one or more function blocks capable of being performed by the devices, and wherein the step of creating includes the step of producing a maintenance schematic that illustrates physical connections between the devices and the bus and that illustrates the function blocks associated with one or more of the illustrated devices.

27. The method of claim 25, wherein the linkage data stored in at least one of the devices further comprises function block communication data pertaining to the manner in which the function blocks are communicatively linked within the process control network, wherein the analyzing step includes the step of identifying a set of process control loops formed by communicatively linked function blocks, and wherein the creating step includes the step of displaying, on the maintenance schematic, an indication of the process control loop with which one of the displayed function blocks is associated.

28. The method of claim 25, wherein the linkage data stored in at least one of the devices comprises process control function data indicating one or more function blocks capable of being performed by the devices and function block communication data pertaining to the manner in which the function blocks are communicatively linked, wherein the analyzing step includes the step of identifying a set of process control loops formed by communicatively linked function blocks, and wherein the step of creating includes the step of producing a control loop schematic depicting one of the identified process control loops.

29. The method of claim 25, wherein the linkage data stored in at least one of the devices comprises process control function data indicating one or more function blocks capable of being performed by the devices, function block execution timing data and function block bus communication scheduling data, wherein the analyzing step includes the step of determining the periods of time associated with the execution of a multiplicity of the function blocks and the periods of time associated with scheduled bus communications for each of the multiplicity of the function blocks, and wherein the step of creating includes the step of producing a timing schematic that illustrates the function block execution periods and the scheduled bus communication periods associated with each of the multiplicity of the function blocks.

30. The method of claim 25, wherein the linkage data stored in at least one of the devices comprises process control function data indicating one or more function blocks capable of being performed by the devices, function block bus communication timing data pertaining to the times that the function blocks communicate on the bus, wherein the step of analyzing includes the step of producing a bandwidth calculation associated with communications occurring on a segment of the bus, and wherein the step of creating includes the step of producing a schematic that illustrates the bus segment and the bandwidth calculation associated with the bus segment.

* * * * *